US011880350B2

(12) United States Patent
McKnight et al.

(10) Patent No.: US 11,880,350 B2
(45) Date of Patent: Jan. 23, 2024

(54) IDENTIFYING RESOURCE LOCK OWNERSHIP ACROSS A CLUSTERED COMPUTING ENVIRONMENT

(71) Applicant: INTERNATIONAL BUSINESS MACHINES CORPORATION, Armonk, NY (US)

(72) Inventors: David Kenneth McKnight, Newmarket (CA); Yichong Zhang, Markham (CA); Dung Thi Tang, Richmond Hill (CA); Onno Van den Troost, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 233 days.

(21) Appl. No.: 17/341,519

(22) Filed: Jun. 8, 2021

(65) Prior Publication Data
US 2022/0391374 A1 Dec. 8, 2022

(51) Int. Cl.
*G06F 16/00* (2019.01)
*G06F 16/23* (2019.01)

(52) U.S. Cl.
CPC ................ *G06F 16/2343* (2019.01)

(58) Field of Classification Search
CPC .................................. G06F 16/2343
See application file for complete search history.

(56) References Cited

U.S. PATENT DOCUMENTS

| 5,551,046 | A | * | 8/1996 | Mohan ...................... G06F 9/52 711/119 |
| 5,920,873 | A | * | 7/1999 | Van Huben ............ G06Q 10/04 |
| 6,105,099 | A | * | 8/2000 | Freitas ...................... G06F 9/52 710/1 |
| 7,992,148 | B2 | | 8/2011 | Collins et al. |
| 8,195,704 | B2 | | 6/2012 | Kimmel et al. |

(Continued)

FOREIGN PATENT DOCUMENTS

CN 106293510 B 6/2019

OTHER PUBLICATIONS

Mel et al., "The NIST Definition of Cloud Computing," National Institute of Standards and Technology, Information Technology Laboratory, Special Publication 800-145, Sep. 2011 (pp. 1-7).

(Continued)

*Primary Examiner* — Syed H Hasan
(74) *Attorney, Agent, or Firm* — Teddi Maranzano, Esq.; Kevin P. Radigan, Esq.; HESLIN ROTHERBERG FARLEY & MESITI P.C.

(57) ABSTRACT

Resource lock ownership identification is provided across processes and systems of a clustered computing environment by a method which includes saving by a process, based on a user acquiring a resource lock, a lock information record to a shared data structure of the clustered computing environment. The lock information record includes user identification data identifying the user-owner of the resource lock acquired on a system executing the process. The method also includes referencing, by another process, the lock information record of the shared data structure to ascertain the user identification data identifying the user-owner of the resource lock, and thereby facilitate processing within the clustered computing environment.

20 Claims, 13 Drawing Sheets

(56) References Cited

U.S. PATENT DOCUMENTS

| | | | |
|---|---|---|---|
| 2002/0116506 A1 | 8/2002 | Lautner | |
| 2004/0202013 A1* | 10/2004 | Dove | G06F 11/0793 |
| | | | 365/154 |
| 2005/0223005 A1 | 10/2005 | Shultz et al. | |
| 2008/0235298 A1* | 9/2008 | Lin | G06F 16/2343 |
| 2010/0023803 A1* | 1/2010 | Lehr | G06F 11/2028 |
| | | | 714/E11.021 |
| 2010/0057741 A1* | 3/2010 | Fincher | G06F 9/52 |
| | | | 707/E17.007 |
| 2012/0131058 A1 | 5/2012 | Farber et al. | |
| 2013/0111026 A1 | 5/2013 | Chambliss et al. | |
| 2014/0365549 A1* | 12/2014 | Jenkins | G06F 9/526 |
| | | | 709/201 |
| 2015/0052104 A1* | 2/2015 | Shadmon | G06F 16/2343 |
| | | | 707/613 |

OTHER PUBLICATIONS

IBM Publication, "z/Architecture Principles of Operation," IBM® Publication No. SA22-7832-12, 13th Edition, Sep. 2019 (pp. 1-2000).

\* cited by examiner

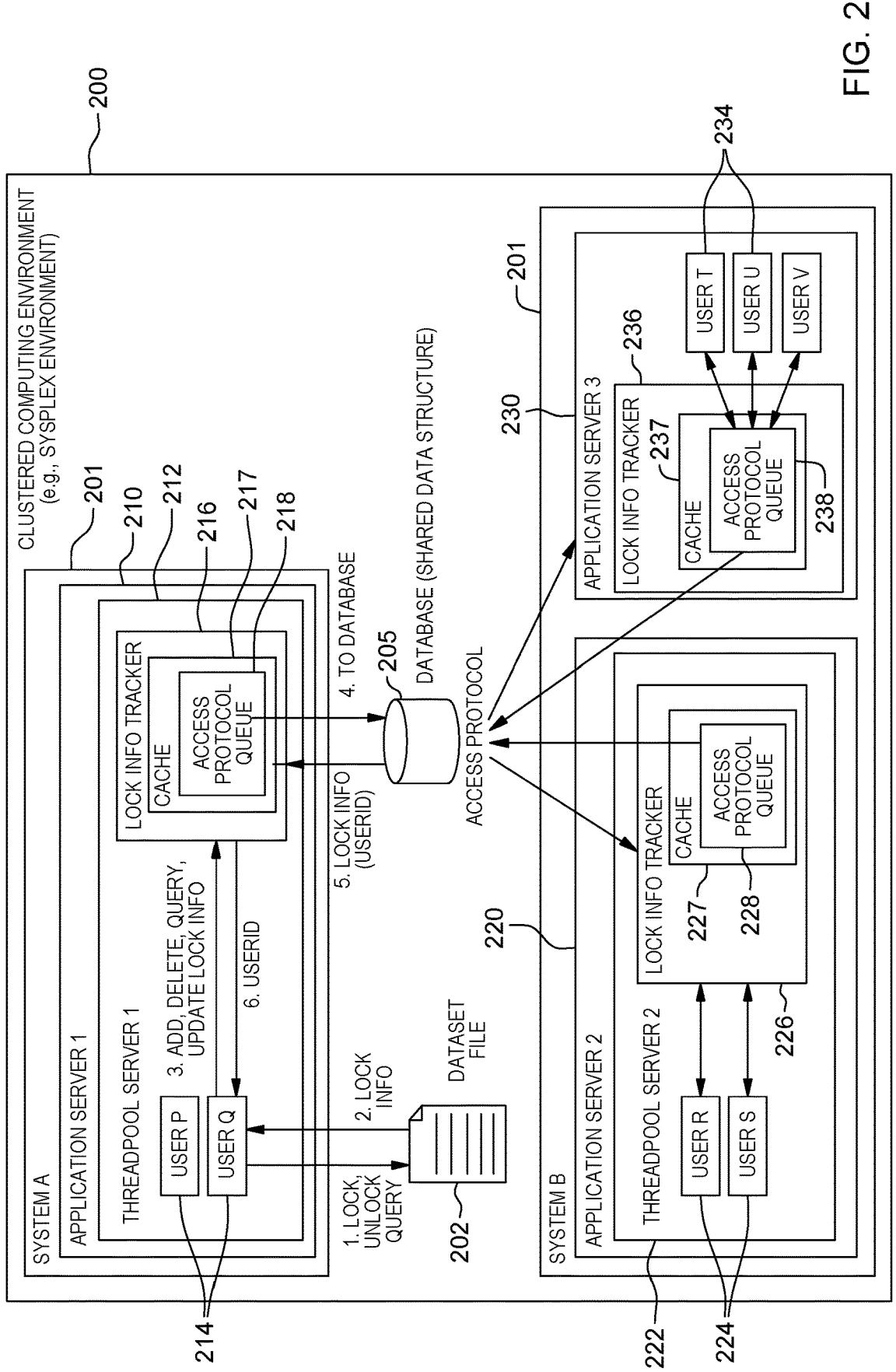

LOCK INFORMATION RECORD IN DATABASE

| DATABASE INDEX | CONTENT | MAX CHARACTER ALLOWED | COMMENTS |
|---|---|---|---|
| 0-53 | DSN | 54 | KEY FOR EACH RECORD, IT IS UNIQUE(RESOURCE) |
| 54-61 | USERID | 8 | OWNER FOR LOCK |
| 62-69 | SYSNAME | 8 | SYSTEM NAME OF WHICH LOCK IS ACQUIRED |
| 70-77 | JOBNAME | 8 | THE JOB NAME OF WHICH LOCK IS ACQUIRED |
| 75-85 | TCB | 8 | TASK CONTROL BLOCK ID |
| 86-89 | ASID | 4 | ADDRESS SPACE ID |
| 90-103 | yyyyMMddHHmmss | 14 | DATE AND TIME OF WHEN LOCK INFORMATION IS CREATED |

FIG. 4

SAVE, BY A PROCESS, BASED ON A USER ACQUIRING A RESOURCE LOCK, A LOCK INFORMATION RECORD TO A SHARED DATA STRUCTURE OF THE CLUSTERED COMPUTING ENVIRONMENT, THE LOCK INFORMATION RECORD INCLUDING USER IDENTIFICATION DATA IDENTIFYING THE USER-OWNER OF THE RESOURCE LOCK ACQUIRED ON A SYSTEM EXECUTING THE PROCESS —500

REFERENCE, BY ANOTHER PROCESS, THE LOCK INFORMATION RECORD OF THE SHARED DATA STRUCTURE TO ASCERTAIN THE USER IDENTIFICATION DATA IDENTIFYING THE USER-OWNER OF THE RESOURCE LOCK TO FACILITATE PROCESSING WITHIN THE CLUSTERED COMPUTING ENVIRONMENT —502

WHERE THE LOCK INFORMATION RECORD FURTHER INCLUDES A JOB NAME ASSOCIATED WITH OBTAINING THE RESOURCE LOCK, AND ONE OR MORE OF A SYSTEM NAME OF THE SYSTEM OBTAINING THE RESOURCE LOCK, A TASK CONTROL BLOCK IDENTIFIER ASSOCIATED WITH THE RESOURCE LOCK, AN ADDRESS SPACE IDENTIFIER ASSOCIATED WITH THE RESOURCE LOCK, OR A TIMESTAMP OF WHEN THE LOCK INFORMATION RECORD WAS CREATED —504

FURTHER INCLUDING, BASED ON ACQUIRING THE RESOURCE LOCK, SAVING TO A CACHE ASSOCIATED WITH THE PROCESS THE LOCK INFORMATION RECORD IN ADDITION TO SAVING THE LOCK INFORMATION RECORD TO THE SHARED DATA STRUCTURE OF THE CLUSTERED COMPUTING ENVIRONMENT, AND INITIATING AN EXPIRATION TIMER FOR THE LOCK INFORMATION RECORD SAVED TO THE CACHE —506

FIG. 5A

WHERE THE REFERENCING IS BASED ON A REQUEST QUERY AND ASSOCIATED EXPECTED OWNER DATA, THE EXPECTED OWNER DATA INCLUDING EXPECTED OWNER INFORMATION FOR THE RESOURCE LOCK, AND THE METHOD INCLUDES: 508

- CHECKING TO DETERMINE WHETHER THE EXPIRATION TIMER FOR THE LOCK INFORMATION RECORD SAVED TO THE CACHE HAS EXPIRED 510

- BASED ON THE EXPIRATION TIMER NOT HAVING EXPIRED, DETERMINING WHETHER THE EXPECTED OWNER INFORMATION OF THE EXPECTED OWNER DATA MATCHES CORRESPONDING LOCK INFORMATION OF THE LOCK INFORMATION RECORD IN THE CACHE TO VERIFY THE LOCK INFORMATION RECORD, THE EXPECTED OWNER INFORMATION INCLUDING AT LEAST ONE OF A USERID IDENTIFYING AN EXPECTED USER-OWNER OF THE RESOURCE LOCK OR AN EXPECTED JOB NAME ASSOCIATED WITH THE ACQUIRED RESOURCE LOCK 512

- BASED ON THE EXPECTED OWNER INFORMATION MATCHING THE CORRESPONDING LOCK INFORMATION OF THE LOCK INFORMATION RECORD IN THE CACHE, PROVIDING A REPLY TO THE QUERY REQUEST WITH THE USER IDENTIFICATION DATA IDENTIFYING THE USER-OWNER OF THE RESOURCE LOCK 514

WHERE BASED ON THE EXPECTED OWNER INFORMATION NOT MATCHING THE USER-OWNER INFORMATION OF THE LOCK INFORMATION RECORD IN THE CACHE, THE METHOD INCLUDES: 516

- DELETING THE LOCK INFORMATION RECORD FROM THE CACHE 518

- RETRIEVING THE LOCK INFORMATION RECORD FROM THE SHARED DATA STRUCTURE 520

- WHEREIN THE DETERMINING FURTHER INCLUDES

- DETERMINING WHETHER THE EXPECTED OWNER INFORMATION OF THE EXPECTED OWNER DATA MATCHES THE CORRESPONDING LOCK INFORMATION OF THE RETRIEVED LOCK INFORMATION RECORD FROM THE SHARED DATA STRUCTURE TO VERIFY THE LOCK INFORMATION RECORD 522

- BASED ON THE EXPECTED OWNER INFORMATION MATCHING THE CORRESPONDING LOCK INFORMATION, ADDING THE RETRIEVED LOCK INFORMATION RECORD TO THE CACHE, AND PROVIDING A REPLY TO THE REQUEST QUERY WITH THE USER IDENTIFICATION DATA IDENTIFYING THE USER-OWNER OF THE RESOURCE LOCK 524

FIG. 5B

WHERE BASED ON THE EXPECTED OWNER INFORMATION NOT MATCHING THE CORRESPONDING LOCK INFORMATION FROM THE LOCK INFORMATION RECORD IN THE SHARED DATA STRUCTURE, PERFORMING FURTHER RECORD PROCESSING, THE FURTHER RECORD PROCESSING INCLUDING: ~526

DETERMINING WHETHER THE EXPECTED OWNER DATA INCLUDES NULL EXPECTED OWNER DATA ~528

BASED ON THE EXPECTED OWNER DATA INCLUDING NULL EXPECTED OWNER DATA, DETERMINING WHETHER THE REQUEST QUERY IS FROM THE SAME SYSTEM THAT ACQUIRED THE RESOURCE LOCK ~530

BASED ON THE REQUEST QUERY BEING FROM A DIFFERENT SYSTEM THAN ACQUIRED THE RESOURCE LOCK, HONORING THE RETRIEVED LOCK INFORMATION RECORD AND PROVIDING THE USER IDENTIFICATION DATA FROM THE RETRIEVED LOCK INFORMATION RECORD IN REPLY TO THE REQUEST QUERY ~532

BASED ON THE SYSTEM ISSUING THE REQUEST QUERY BEING THE SAME AS THE SYSTEM ACQUIRING THE RESOURCE LOCK, DELETING THE LOCK INFORMATION RECORD FROM THE SHARED DATA STRUCTURE AND DELETING THE LOCK INFORMATION RECORD FROM THE CACHE, TO SYNC THE SHARED DATA STRUCTURE AND THE CACHE TO THE NULL EXPECTED OWNER DATA ~534

WHERE BASED ON THE EXPECTED OWNER DATA BEING OTHER THAN NULL EXPECTED OWNER DATA, THE FURTHER PROCESSING INCLUDES: ~536

DETERMINING WHETHER THE USER IDENTIFICATION DATA IS PRESENT IN THE SHARED DATA STRUCTURE ~538

BASED ON THE USER IDENTIFICATION DATA NOT BEING LOCATED IN THE SHARED DATA STRUCTURE, ADDING THE EXPECTED OWNER DATA TO THE SHARED DATA STRUCTURE AS THE LOCK INFORMATION RECORD, AND ADDING THE EXPECTED OWNER DATA TO THE CACHE AS THE LOCK INFORMATION RECORD ~540

RETURNING AVAILABLE USER IDENTIFICATION DATA FOR THE USER-OWNER OF THE RESOURCE LOCK IN REPLY TO THE REQUEST QUERY ~542

FIG. 5C

WHERE BASED ON THE EXPECTED OWNER DATA BEING OTHER THAN NULL EXPECTED OWNER DATA, AND BASED ON THE USER IDENTIFICATION DATA BEING LOCATED IN THE SHARED DATA STRUCTURE: ~544

UPDATING THE LOCK INFORMATION RECORD IN THE SHARED DATA STRUCTURE USING THE EXPECTED OWNER DATA, AND UPDATING THE LOCK INFORMATION RECORD IN THE CACHE USING THE EXPECTED OWNER DATA ~546

RETURNING THE USER IDENTIFICATION DATA IDENTIFYING THE USER-OWNER OF THE RESOURCE LOCK FROM THE UPDATED LOCK INFORMATION RECORD IN REPLY TO THE REQUEST QUERY ~548

WHERE THE SYSTEM IS ONE LOGICAL PARTITION OF MULTIPLE LOGICAL PARTITIONS OF THE CLUSTERED COMPUTING ENVIRONMENT, AND THE PROCESS INCLUDES ONE APPLICATION SERVER, AND THE OTHER PROCESS INCLUDES ANOTHER APPLICATION SERVER, AND WHERE THE OTHER PROCESS EXECUTES ON THE SAME SYSTEM THAT ACQUIRED THE RESOURCE LOCK, OR A DIFFERENT SYSTEM FROM THE SYSTEM THAT ACQUIRED THE RESOURCE LOCK ~550

FIG. 5D

IDENTIFYING RESOURCE LOCK OWNERSHIP ACROSS A CLUSTERED COMPUTING ENVIRONMENT

BACKGROUND

One or more aspects relate, in general, to facilitating processing within a computing environment, and in particular, to improving processing within a clustered computing environment.

There are various types of computing environments, ranging from simple environments to more complex environments. A simple environment can include one processor executing one operating system, while a complex environment can include a plurality of processors or a plurality of isolated memory spaces executing various types of systems. In one example, a complex environment includes one or more logical partitions executing one or more operating systems. In one embodiment, a logical partition is a division of a computing environment's processors, memory and storage into multiple sets of resources, so that each set of resources can be operated independently, with its own operating system instance and one or more applications.

In one implementation, a complex computing environment can be configured as a clustered computing environment with multiple systems or computers that work together such that they can be viewed as a single system. The components of a clustered computing environment are typically connected together through fast local-area networks, with each node or system running its own instance of an operating system. In one or more embodiments, the nodes can use the same hardware and the same operating system, although in certain setups, different operating systems can be used on each computer, or different hardware. One example of a clustered computing environment is a z/Architecture® sysplex computing environment, offered by International Business Machines Corporation, Armonk, New York (z/Architecture is a trademark or registered trademark of International Business Machines Corporation in one or more jurisdictions.) In one embodiment, a sysplex computing environment includes multiple computers or systems that make up the complex.

In one or more implementations, it is common for end users to have many instances of an operating system running in a clustered computing environment. To access resources on an operating system, end users will often deploy application servers. Application servers allow access to resources in a secure manner and, in certain embodiments, allow the users to lock and unlock resources.

SUMMARY

Certain shortcomings of the prior art are overcome and additional advantages are provided through the provision, in one or more aspects, of a computer program product for facilitating processing within a clustered computing environment. The computer program product includes at least one computer-readable storage medium having program instructions embodied therewith. The program instructions are readable by a processing circuit to cause the processing circuit to perform a method, which includes saving by a process, based on a user acquiring a resource lock, a lock information record to a shared data structure of the clustered computing environment. The lock information record includes user identification data identifying the user-owner of the resource lock acquired on a system executing the process. The method further includes referencing, by another process, the lock information record of the shared data structure to ascertain the user identification data identifying the user-owner of the resource lock to facilitate processing within the clustered computing environment.

Computer systems and computer-implemented methods relating to one or more aspects are also described and claimed herein. Further, services relating to one or more aspects are also described and may be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 2 depicts one example of a clustered computing environment with a shared data structure and identification of user-owners of resource locks across processes and systems of the clustered computing environment, in accordance with one or more aspects of the present invention;

FIG. 4 depicts one example of a lock information record that is saved to cache and to a shared data structure of the clustered computing environment, in accordance with one or more aspects of the present invention;

FIGS. 5A-5D depict one example of facilitating processing within a computing environment, in accordance with one or more aspects of the present invention;

DETAILED DESCRIPTION

In accordance with an aspect of the present invention, communication of resource lock information between processes and systems of a clustered computing environment is facilitated. As one example, the clustered computing environment can be a sysplex environment that includes multiple tightly-coupled systems. For instance, the clustered computing environment can have many instances of an operating system running in the clustered computing environment. In one embodiment, the clustered computing environment is a cluster of computers or systems that are configured to behave as a single operating system image, such as a single z/OS® image. To access resources on the single operating system image, application servers can be deployed. These servers allow access to resources in a secure manner, and in certain cases, allow the users to lock and unlock resources, such as multiple virtual storage (MVS™) resources. (Note that z/OS and MVS are trademarks or registered trademarks of International Business Machines Corporation in one or more jurisdictions.)

The lock tracking mechanisms provided by certain operating systems, such as the z/OS system, and certain application servers, often extend to the task of an address space or process, but not to the particular user-owner of a resource lock within the process or task. Also, resource locks acquired for a given system, such as a given logical partition (LPAR) of the clustered computing environment, are typically not visible from within another system (e.g., another LPAR) of the computing environment. Moreover, mapping user IDs associated with such resource lock may not be feasible across LPARs.

Figure 1A:
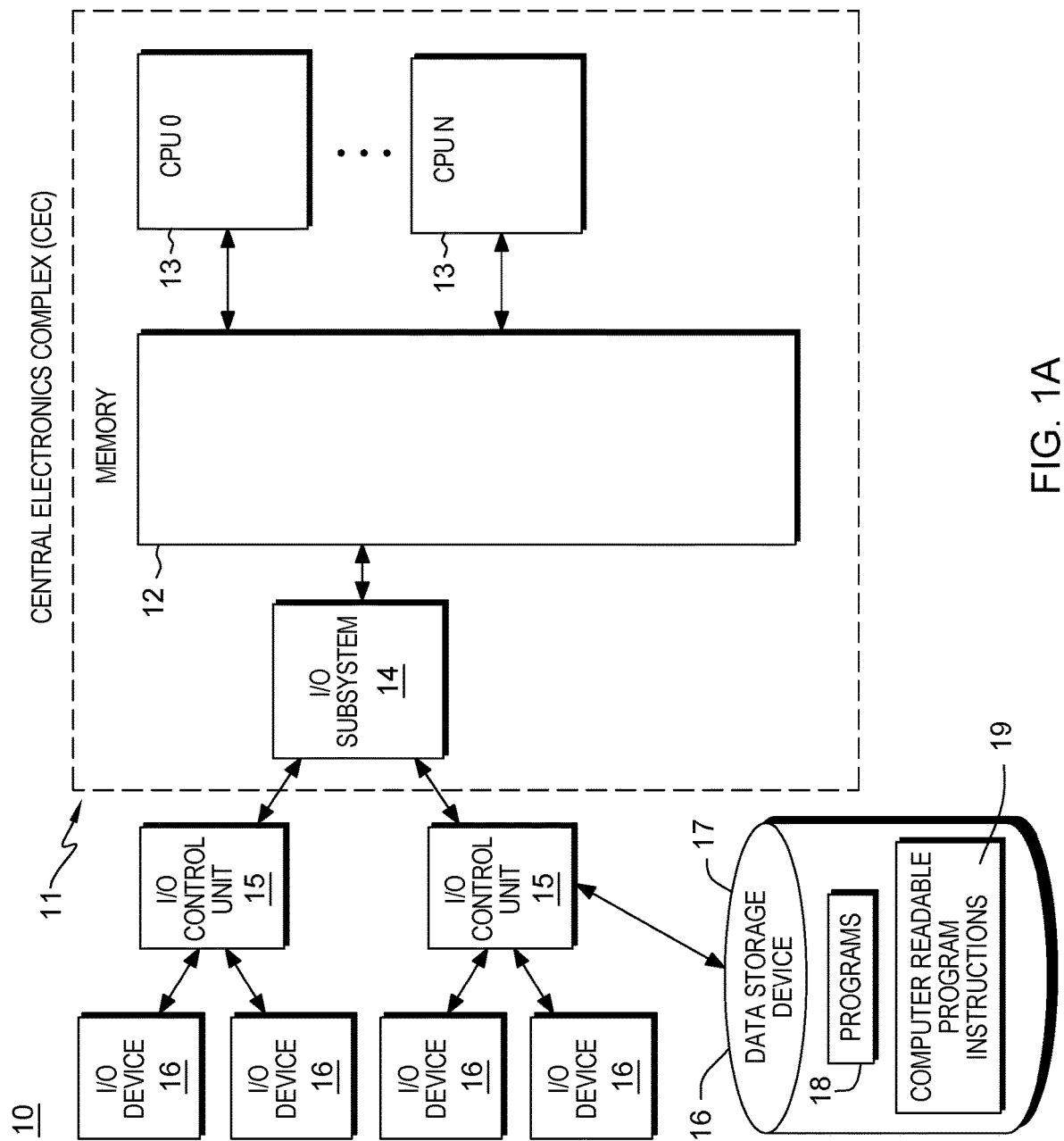
FIG. 1A depicts one example of a computing environment to incorporate and use one or more aspects of the present invention.

By way of example, FIG. 1A depicts one embodiment of a computing environment to incorporate and use one or more aspects of the present invention. In one embodiment, the computing environment is based on the z/Architecture® instruction set architecture, offered by International Business Machines Corporation, Armonk, New York. One embodiment of the z/Architecture instruction set architecture is described in a publication entitled, "z/Architecture Principles of Operation," IBM® Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities may include and/or use one or more aspects of the present invention. (z/Architecture and IBM are trademarks or registered trademarks of International Business Machines Corporation in one or more jurisdictions.)

In one example, a computing environment 10 includes a central electronics complex (CEC) 11. Central electronics complex 11 includes a plurality of components, such as, for instance, a memory 12 (a.k.a., system memory, main memory, main storage, central storage, storage) coupled to one or more processors (a.k.a., central processing units (CPUs)) 13 and to an input/output (I/O) subsystem 14.

I/O subsystem 14 can be a part of the central electronics complex or separate therefrom. It directs the flow of information between main storage 12 and input/output control units 15 and input/output (I/O) devices 16 coupled to the central electronics complex.

Many types of I/O devices may be used. One particular type is a data storage device 17. Data storage device 17 can store one or more programs 18, one or more computer readable program instructions 19, and/or data, etc. The computer readable program instructions can be configured to carry out functions of embodiments of aspects of the invention.

Central electronics complex 11 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 11. Examples include, but are not limited to: microcode, device drivers, redundant processing units, external disk drive arrays, RAID systems, tape drives, and data archival storage systems, etc.

Further, central electronics complex 11 can be operational with numerous other general-purpose or special-purpose computing system environments or configurations. Examples of well-known computing systems, environments, and/or configurations that are suitable for use with central electronics complex 11 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1C:
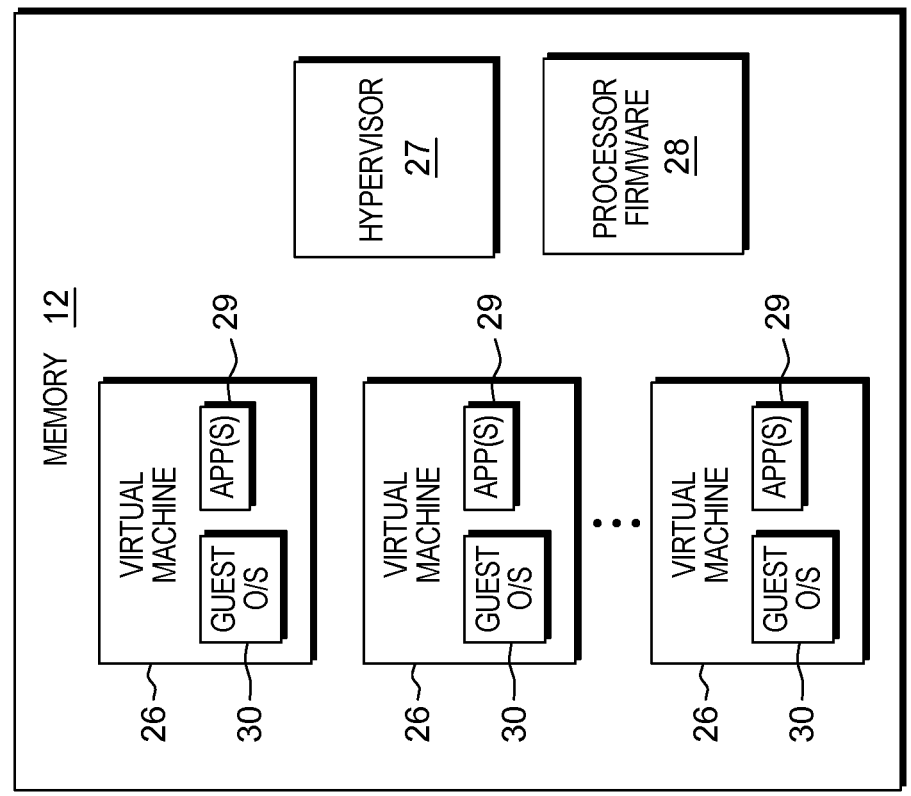
FIG. 1C depicts another example of further details of a memory for the computing environment of FIG. 1A, in accordance with one or more aspects of the present invention.
Figure 1B:
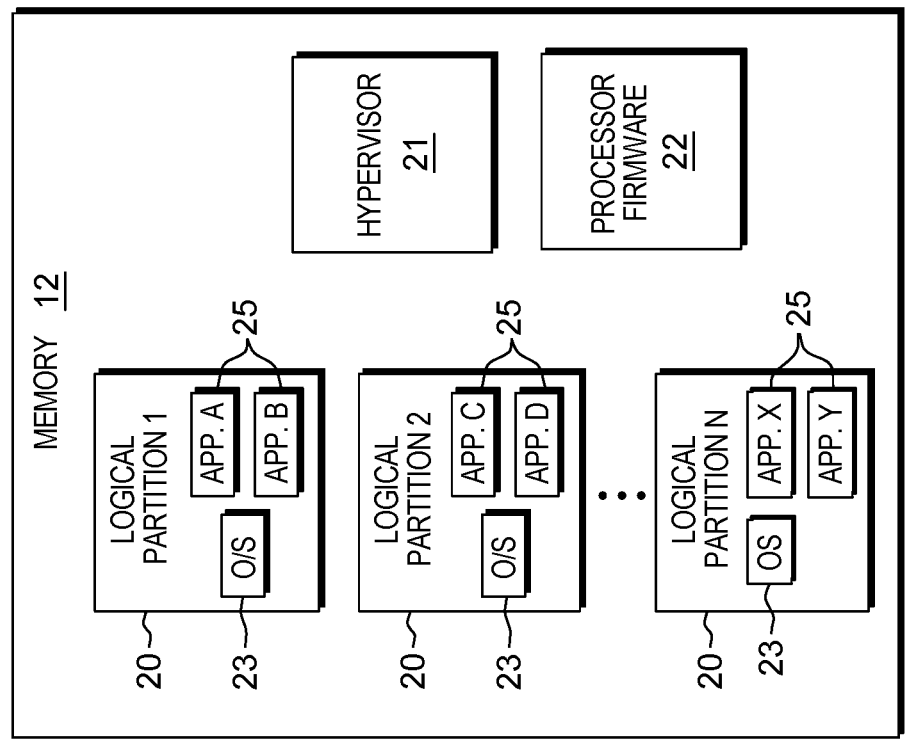
FIG. 1B depicts one example of further details of a memory for the computing environment of FIG. 1A, in accordance with one or more aspects of the present invention.

Central electronics complex 11 provides in one or more embodiments logical partitioning and/or virtualization support. In one embodiment, as shown in FIG. 1B, memory 12 includes, for example, one or more logical partitions 20, a hypervisor 21 that manages the logical partitions, and processor firmware 22. One example of hypervisor 21 is the Processor Resource/System Manager (PR/SW™), offered by International Business Machines Corporation, Armonk, New York. As used herein, firmware includes, e.g., the microcode of the processor. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware. (PR/SM is a trademark or registered trademark of International Business Machines Corporation in one or more jurisdictions.)

Each logical partition 20 is capable of functioning as a separate system. That is, each logical partition can be independently reset, run a guest operating system 23 such as the z/OS operating system, offered by International Business Machines Corporation, or other control code, and operate with different application programs 25. An operating system or application program running in a logical partition appears to have access to a full and complete system, but in reality, only a portion of it is available. Although the z/OS operating system is offered as an example, other operating systems offered by International Business Machines Corporation and/or other companies may be used in accordance with one or more aspects of the present invention.

Memory 12 is coupled to CPUs 13 (FIG. 1A), which are physical processor resources that can be allocated to the logical partitions. For instance, a logical partition 20 includes one or more logical processors, each of which represents all or a share of a physical processor resource 13 that can be dynamically allocated to the logical partition.

In yet a further embodiment, the central electronics complex provides virtual machine support (either with or without logical partitioning support). As shown in FIG. 1C, memory 12 of central electronics complex 11 includes, for example, one or more virtual machines 26, a virtual machine manager, such as a hypervisor 27, that manages the virtual machines, and processor firmware 28. One example of hypervisor 27 is the z/VM® hypervisor, offered by International Business Machines Corporation, Armonk, New York. The hypervisor is sometimes referred to as a host. (z/VM is a trademark or registered trademark of International Business Machines Corporation in one or more jurisdictions.)

The virtual machine support of the central electronics complex provides the ability to operate large numbers of virtual machines 26, each capable of operating with different application programs 29 and running a guest operating system 30, such as the Linux® operating system. Each virtual machine 26 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

As noted, a clustered computing environment can include multiple systems (e.g., logical partitions or virtual machines) coupled together and configured to behave as a single operating system image. In one embodiment, to access resources on the single operating system image, application servers can be deployed. Within the clustered computing environment, the application servers can support multiple users. With application servers that support multiple users, such as z/OS MF, remote system explorer daemon (RSED) and remote system explorer API (RSE API), there is an internal notion of a user resource lock. Due to the nature of the operating system, the user-owner of the resource lock, however, is typically not visible outside of the particular server application of the clustered computing environment acquiring the lock. Furthermore, with a single operating system instance (e.g., a single logical partition), a customer can be running multiple application servers of the same type at the same time. For instance, a remote system explorer (RSE) server, which supports MVS resource locks associated with particular users, can have multiple concurrent deployments and versions running at the same time. With users running on different operating system instances, existing RSE implementations do not allow users on each application server to know the true resource lock owner. Rather, the users typically only see the job (or process) name as the lock owner, which can make it difficult for a given user to identify the user who actually owns the resource lock. Moreover, users on the application layer of different systems in a clustered computing environment, such as a sysplex environment, are typically unable to acquire lock information from each other. Namely, one system often does not know a given resource may be locked, and being edited by another user on another system. This means that there is a risk that resource content can be deleted or corrupted by another user without warning. Furthermore, when using a load balancer, such as a WLM, or otherwise deploying multiple instances of an application server, separate processes are often spawned in order to support a large load of concurrent users. This drives the need for a technological solution to oversee resource locks across different processes within a system (such as within an LPAR) and across different systems (such as across different LPARs) of a clustered computing environment.

Embodiments of the present invention include a computer program product, computer system and a computer-implemented method, where program code executing on one or more processors facilitates processing within a clustered computing environment, and more particularly, facilitates communication of resource lock information between processes and systems of the clustered computing environment. As understood by one skilled in the art, program code, as referred to in this application, can include both software and hardware. For example, program code in one or more aspects of the present invention can include fixed function hardware, while other aspects can utilize a software-based implementation of the functionality described. Certain embodiments can combine both types of program code. One example of program code, also referred to as one or more programs, is depicted as applications 25 or 29 in memory 12 of FIGS. 1B & 1C, as well as programs 18 and computer-readable program instructions 19 in data storage device 17 in the example of FIG. 1A.

In one or more embodiments, the present invention includes program code which facilitates saving by a process, based on a user acquiring a resource lock, a lock information record to a shared data structure of the clustered computing environment. The lock information record includes user identification data identifying the user-owner of the resource lock acquired on a system executing the process. Embodiments of the present invention also include program code which facilitates referencing, by another process, the lock information record of the shared data structure to ascertain the user identification data identifying the user-owner of the resource lock to facilitate processing within the clustered computing environment.

In certain embodiments, the lock information record further includes a job name associated with the resource lock and one or more of a system name of the system obtaining the resource lock, a task control block identifier associated with obtaining the resource lock, an address space identifier associated with obtaining the resource lock, and a timestamp of when the lock information record is created In one or more embodiments of the present invention, the program code facilitates, based on acquiring the resource lock, saving to a cache associated with the process the lock information record in addition to saving the lock information record to the shared data structure of the clustered computing environment, and initiating an expiration timer for the lock information record saved to the cache.

In certain implementations, the program code references the shared data structure based on receiving a request query and associated expected owner data. The expected owner data includes expected owner information for the resource lock, and the program code facilitates checking to determine whether the expiration timer for the lock information record saved to the cache has expired. Based on the expiration timer not having expired, the program code determines whether the expected owner information of the expected owner data matches corresponding lock information of the lock information record data in the cache to verify identification of the user-owner of the resource lock. The expected owner information includes at least one of a userID identifying an expected user-owner of the resource lock, or an expected job name associated with the acquired resource lock. Further, based on the expected owner information matching the corresponding lock information of the lock information record in the cache, the program code provides a reply to the request query with the user identification data identifying the user-owner of the resource lock.

In one or more embodiments, based on the expected owner information not matching the corresponding lock information ascertained of the lock information record in the cache, the program code deletes the lock information record from the cache, and retrieves the lock information record from the shared data structure. In this situation, the program code further determines whether the expected owner information of the expected owner data matches the corresponding lock information of the retrieved lock information record from the shared data structure to verify identification of the user-owner of the resource lock. Based on the expected owner information matching the corresponding lock information, the program code adds the retrieved lock information record to the cache, and provides a reply to the request query with the user identification data identifying the user-owner of the resource lock.

In certain implementations, based on the expected owner information not matching the corresponding lock information of the lock information record data retrieved from the shared data structure, the program code performs further processing, including determining whether the expected owner data includes null expected owner data, and based on the expected owner data including the null expected owner data, determines whether the request query is from the same system that acquired the resource lock. Based on the request query being from a different system than acquired the resource lock for the user-owner, the program code honors the retrieved lock information record and provides the user identification data from the retrieved lock information record in reply to the request query. Based on the system issuing the request query being the same as the system acquiring the resource lock, the program code deletes the lock information record from the shared data structure and deletes the lock information record from the cache, to sync the shared data structure in the cache to the null expected owner data.

In one or more embodiments, based on the expected owner data being other than null expected owner data, the further processing of the program code includes determining whether the user identification data is present in the shared data structure, and based on the user identification data not be located in the shared data structure, the program code adds the expected owner data to the shared data structure as the lock information record, and adds the expected owner data to the cache as the lock information record. Further, program code executing on the processing circuit returns available user identification data for the user-owner of the resource lock in reply to the request query.

In certain implementations, based on the expected owner data being other than null expected owner data, and based on the user identification data being located in the shared data structure, the program code facilitates updating the lock information record in the shared data structure using the expected owner data, updating the lock information record in the cache using the expected owner data, and returning the user identification data identifying the user-owner of the resource lock from the updated lock information record in reply to the request query.

In one embodiment, the system is one logical partition of multiple logical partitions of the clustered computing environment, and the process includes one application server, and the other process includes another application server of the clustered computing environment. Further, in one embodiment, the other process executes on the same system that acquired the resource lock, or executes on a different system from the system that acquired the resource lock.

Embodiments of the present invention are inextricably tied to computing and provide significantly more than existing approaches to processing within a clustered computing environment, such as a sysplex environment. For instance, embodiments of the present invention provide program code executing on one or more processing circuits to exploit the interconnectivity of various systems and processes, as well as to utilize various computing-centric data analysis and handling techniques in order to facilitate providing user identification data identifying a user-owner of a resource lock acquired on a system of the clustered computing environment. User-owner identification of resource locks is facilitated across processes and systems of the clustered computing environment, which is particularly advantageous during program development. Both the interconnectivity of computing systems utilized and the computer-exclusive data processing techniques utilized by the program code, enable various aspects of the present invention. Further, embodiments of the present invention provide significantly more than any existing approaches for identifying resource lock within a clustered computing environment.

In embodiments of the present invention, the program code provides significantly more functionality, including but not limited to: 1) program code that saves by a process, based on a user acquiring a resource lock, a lock information record to a shared data structure of the clustered computing environment, where the lock-owner record data includes user identification data identifying the user-owner of the resource lock acquired on a system executing the process; and 2) program code that references, by another process, the lock information record of the shared data structure to ascertain the user identification data identifying the user-owner of the resource lock to facilitate processing within the clustered computing environment.

FIG. 2 depicts one technical implementation of a clustered computing environment incorporating one or more aspects of a facility for identifying a user-owner of a resource lock across processes and systems of the computing environment, in accordance with one or more aspects of the present invention.

As illustrated in FIG. 2, clustered computing environment 200 includes multiple systems 201, such as multiple logical partitions (LPARs), with each logical partition being a different instance of an operating system running within the clustered computing environment. In one embodiment, the clustered computing environment is a cluster of computers, such as a cluster of mainframes, that are configured and coupled to behave as a single operating system image. To access resources within the clustered computing environment, application servers 210, 220, 230 are deployed on one or more systems 201 of clustered computing environment 200. In one embodiment only, one or more of the application servers 210, 220 include thread pool servers 212, 222, respectively, to facilitate one or more users 214, 224 locking and unlocking resources 202 (such as a dataset files) of the clustered computing environment 200. In accordance with one or more aspects of the present invention, a database 205 is provided which is accessible by the processes or application servers 210, 220, 230, and which includes a shared data structure that facilitates communication of resource lock information between processes and systems of the clustered computing environment, such as described herein.

In one operational embodiment, a user 214 obtains a resource lock (1), with lock information (2) being generated as part of obtaining the lock on the resource 202. In accordance with one or more aspects disclosed herein, the process (e.g., application server 210) can add, delete or query update lock information (3) via a lock information tracker process 216, 226, 236 associated (in one embodiment) with the respective thread pool servers 212, 222. In one implementation, the application servers further include respective caches 217, 227, 237, which can include an access protocol queue 218, 228, 238, in one implementation. The add, delete and query operations can result in updates to the cache (which in one embodiment, contains one or more lock information records, such as discussed herein) as well as updates to database 205, which in one embodiment, contains one or more lock information records in a shared data structure accessible by other processes and systems of the clustered computing environment. When querying the cache or shared data structure (4), the reply contains lock information (5), such as a lock-owner identification (userID), which is returned (6) to the user initiating the request query for identification of the entity possessing the resource lock at issue.

As one specific example, the clustered computing environment can be a sysplex environment where systems 201 are respective logical partitions, with application servers 210, 220, 230, running within the depicted logical partitions. In one embodiment, one or more of the application servers can be, or include, for instance, a remote system explorer daemon (RSED) and/or a remote system explorer API (RSE API), such as offered by International Business Machines Corporation. For instance, a remote system explorer (RSE) server, which supports MVS resource locks associated with particular users, can be used, with multiple concurrent deployments and versions running at the same time within one or more systems of the clustered computing environment.

In one implementation, database 205 uses an associated access protocol, such as the virtual storage access method (VSAM), to track lock ownership on each process in each system, in accordance with one or more aspects of the present invention. The virtual storage access method is a high-performance access method used to organize data in the form of files in one or more systems, such as one or more mainframes, and is used in, for instance, MVS and z/OS, offered by International Business Machines Corporation. The virtual storage access method is a file management system or access protocol used in association with database 205. In one implementation, the virtual storage access method allows access and organization of records in a disk dataset, with the virtual storage access method working with data that stores on direct-access storage devices. VSAM records or files can be of fixed or variable length. The advantage of using a VSAM is that this type of dataset is designed to be shared across different processes and systems in a single clustered computing environment, such as a single sysplex, with good concurrent file input/output performance.

In one embodiment of the present invention, multiple types of application servers can be provided, each of which can handle resource access and lock management, where it is assumed that end users can work with one or any of the types of application servers. For instance, for MVS resource access, the remote system explorer daemon (RSED) and/or remote system explorer API (RSE API) can be used to facilitate locking and unlocking resources. Since there are typically many instances of such application servers, disclosed herein is the ability for any one of the servers to be able to obtain lock-owner information from any other server, regardless of which system(s) the servers reside on. Furthermore, the technical implementations disclosed herein advantageously maintain good performance within the clustered computing environment, and integrity of the VSAM, ensuring that the secure data structure is not compromised, even when anomalies occur.

In one embodiment, the VSAM key sequence dataset (KSDS) can be used to maintain a lock information record containing lock-owner information, as well as where and when the lock was acquired. In one implementation, the lock information record can include unique keys, including the resource name at issue, user identification data (e.g., user ID), the system name of the system acquiring the resource lock (sysname), the job name associated with obtaining the resource lock, a task control block (TCB) identifier associated with the resource lock, an address space identifier (ASID) associated with the resource lock, and a timestamp of when the lock information record was created. In one embodiment, in addition to the userID and the job name, the lock information record can include one or more of the other noted keys, or all of the above-noted keys. In one implementation, the VSAM can be written sequentially and the records can be retrieved sequentially, or dynamically.

In one embodiment, whenever a lock is required, the program code adds a record in the shared data structure (e.g., in the VSAM dataset). Similarly, whenever a lock is released, the corresponding lock information record in the shared data structure (e.g., the corresponding VSAM record) is removed. In addition, a query lock process is provided to, for instance, ascertain whether a lock has been acquired by a user in another process or another system of the clustered computing environment. In this manner, the true user-owner of a resource lock can be ascertained, rather than simply a job name associated with a resource lock, or the existence of no information at all. Additionally, as explained herein, the program code is configured to handle a situation where lock information records are out-of-sync, either in a cache associated with the process acquiring the lock, or in the shared data structure of the database. An ability to auto-correct out-of-sync information is disclosed whenever a discrepancy is identified. When identified, applicable action is taken, including, for instance, modifying when appropriate the lock information record, adding a missing lock information record, or deleting a saved lock information record.

To maintain or speed up performance within the clustered computing environment, a cache is also implemented on, for instance, each process to track lock information records, including lock ownership information, as well as saving the lock information records to the shared data structure (e.g., via the VSAM interface). In one embodiment, the associated cache stores a list of resources (datasets or members) owned by each user. Due to the possibility of the shared data structure being out-of-sync, an expiration timer is also provided on the cache for the lock information record. When the cache record is within a valid time duration, the program code prioritizes lookup of the lock information record in the cache. In one implementation, the cache input/output operation can be the same as the shared data structure input/output operation (e.g., the VSAM I/O operations). When the expiration timer expires, and a request query lookup is triggered, the associated cache updates itself with the latest shared data structure content to mitigate any potential out-of-sync issue with the shared data structure content. In one implementation, where the application server is an RSE API, the associated cache can also be used when current, as well as for user-session exits and corresponding removal of lock information records from the shared data structure (e.g., removal of corresponding VSAM records). As noted, in one embodiment, the lock information records can be stored sequentially in the shared data structure, and where the lookup keys refer to MVS resources, such that it can be expensive to go through the entire lock information records of the shared data structure to determine which resource belongs to that specific user, the associated cache can be relied on to obtain the list of resources (e.g., MVS resources), and then to use those resources as keys to locate the desired lock information record in order to, for instance, allow for the desired lock information record read, update or deletion to occur, which facilitates reducing the shared data structure I/O processing time.

In one or more implementations, with the presence of an audit log to track the history of the lock records for each user, an artificial-intelligence-driven engine can be utilized to run in parallel with, or within, the clustered computing environment, for instance, in order to capture and analyze data to better understand user accesses. For instance, in one embodiment, artificial intelligence processing can be utilized to learn the pattern of which resource is most likely to be used (i.e., locked), and for how long that resource is likely to be used, and then to offer solutions to have predictive locking and unlocking feedback based on prior user experience. For instance, some embodiments of the present invention can utilize IBM Watson® as a learning agent. (IBM Watson is a registered trademark of International Business Machines Corporation, Armonk, New York, USA, in one or more jurisdictions.) In embodiments of the present invention, one or more aspects of the respective program code can interface with IBM Watson application program interfaces (APIs) to perform, for instance, machine learning analysis of obtained data. In some embodiments of the present invention, the respective program code can interface with the application programing interfaces (APIs) that are part of a known machine-learning agent, such as the IBM Watson application programing interface (API), a product of International Business Machines Corporation, to determine resource usage patterns, and to predict locking and unlocking, based on prior user data. The predictive locking and unlocking information can then be used to enhance program development, in one example.

Figure 3A:
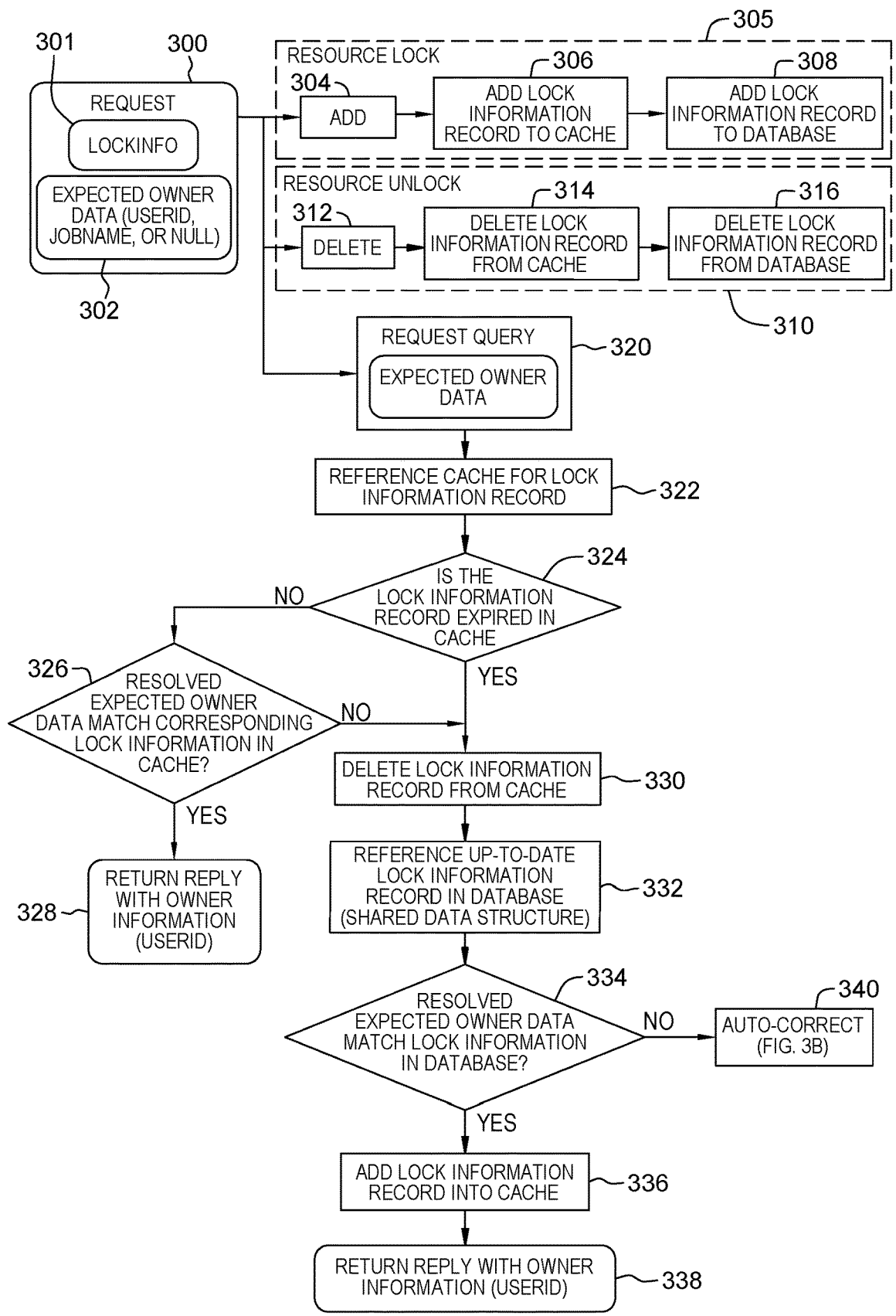
FIGS. 3A-3B depict one embodiment of a workflow illustrating certain aspects of one or more embodiments of the present invention.
Figure 3B:
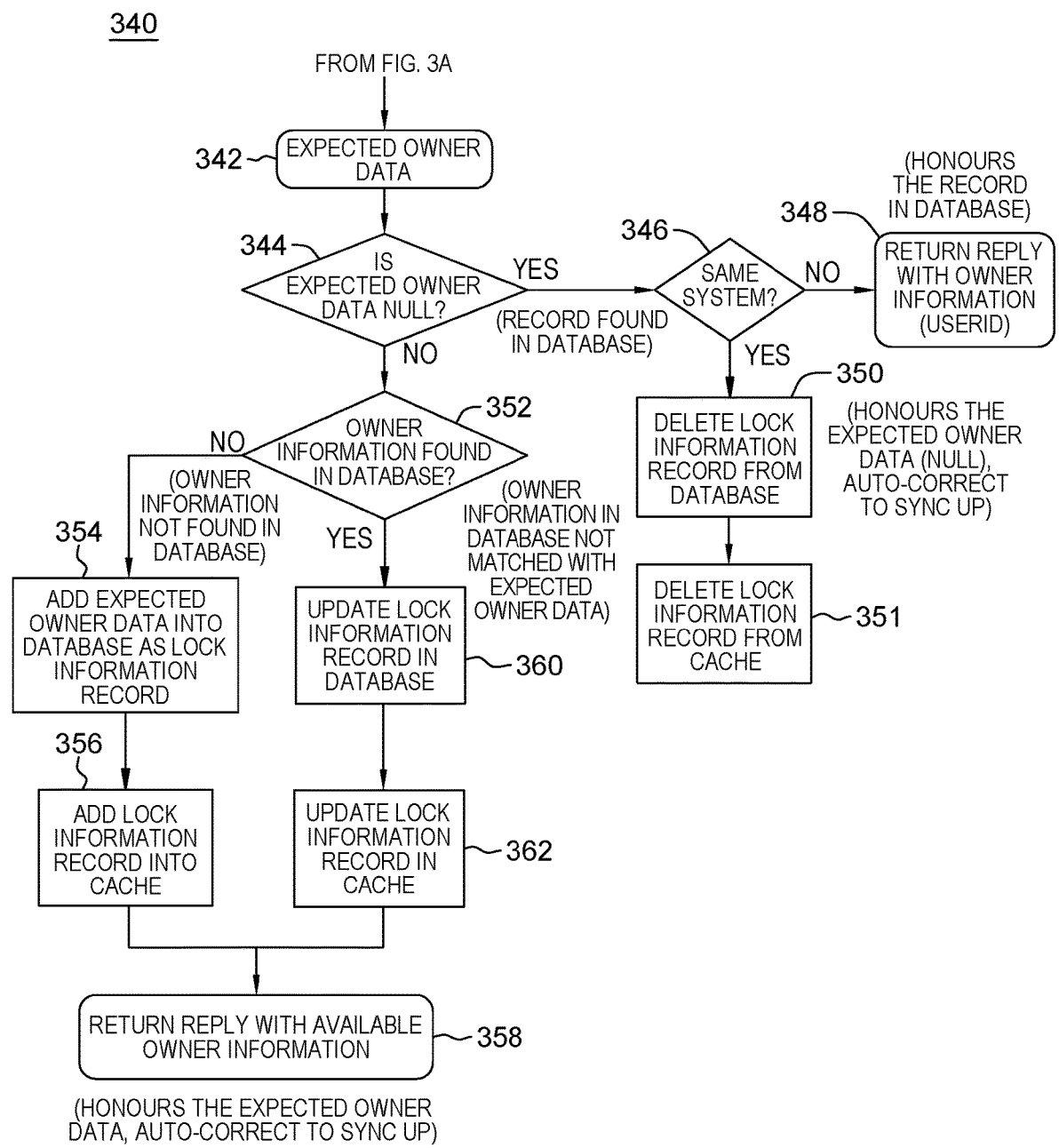

By way of example, FIGS. 3A-3B depict one embodiment of a workflow illustrating certain aspects of one or more embodiments of the present invention. In this workflow example, a request 300 can be a request to add a resource lock 302, delete a resource lock 310, or a request to query user-owner information of a resource lock 320. The request can include lock information 301, and in one embodiment, expected owner data 302. In one embodiment, one or more systems in the clustered computing environment can have one or more processes or application servers running, for instance, a remote system explorer (RSE), as offered by International Business Machines Corporation, and one or more processes can have many threads (e.g., pthread security), which tie to the user(s) as lock-owner(s), seen by the acquiring process.

In one embodiment, the expected owner data available can be data that includes a true lock-owner identification if the process making the request query is the same process as acquired the lock, the job name of the process acquiring the lock if the lock-owner resides within another process in the same system (e.g., same LPAR), or no information (null) when the lock-owner is at another system of the clustered computing environment. Advantageously, the program code disclosed herein returns an identification of the user-owner of a resource lock from a shared data structure lookup, as well as the ability to self-correct the shared data structure record if an anomaly is detected.

When a query lock-ownership is received, the expected owner data noted above can be leveraged in association with a lookup in the cache and/or shared data structure, for instance, via the VSAM, with branching to an appropriate one of several possible scenarios, labelled Scenarios 1-6 herein by way of example only. For instance, Scenario 1 can occur when the expected owner data is null, and a lock information record cannot be found in the shared data structure (via VSAM), meaning the resource is unlocked everywhere in the computing environment, and thus, a null is returned as the query result. In Scenario 2, if the expected owner data is null, but the shared data record (e.g., accessed via VSAM protocol) holds the lock information record, there are two further branch cases. First, if this occurs on a different system in the clustered computing environment, meaning the expected owner data is null, then the owner data presented in the shared data structure is relied on. Second, if this is happening on the same system for the query process and the lock-owner process, meaning that the resource is unlocked on the server level, but for some reason, the lock information record was not previously deleted properly, the access protocol (VSAM) will now delete the record so that other processes will know the resource is released.

In Scenario 3, if an expected owner is not null, but the shared data structure does not contain a lock information record for the lock resource, an anomaly is detected. In this case, the missing record is added to the shared data structure using the expected owner data. This case can happen when a process, which lacks the support such as described herein, locks the resource or file (which will not have any effect on the shared data structure), and another process, which has the program code disclosed herein (e.g., VSAM support) queries the resource lock status. The running process which queries the lock status will add the missing piece of record into the shared data structure to indicate that the file is locked by another process. Note that if the expected owner data is job name data only, then the user identification data field (userID) can be left as "any user". In Scenario 4, if the expected owner data is not null, and the shared data structure holds the lock information record, meaning that the resource is locked and information is in sync, then the owner information (userID) is returned. In Scenario 5, if the expected owner data is a job name, and not the actual userID, meaning that the lock was acquired on another process in the same system, then the lock information record is located in the shared data structure (e.g., via VSAM access protocol), and the actual owner information (userID) is returned instead of a process ID (e.g., job name). If the owner in the lock information record is "any user", as in effect after Scenario 3, then the process ID (job name) is returned as the owner information. In Scenario 6, if the expected owner data contains actual owner identification (userID), but does not match with the corresponding lock information record in the shared data structure, an anomaly is detected. In this situation, the expected owner data is written into the lock information record to correct the anomaly. This scenario can happen where the lock owner changes, but the lock owner record in the shared data structure does not update in time. After the record is corrected and updated, the true owner information (userID) is returned.

To summarize, Scenario 1 and 4 above are good use cases to indicate that a lock is not acquired anywhere, or acquired at someplace. Scenario 2 addresses a cross-systems case in the clustered computing environment, which enables seeing the true lock owner. If the systems are the same (e.g., the same LPARs), auto-correction is initiated to delete such a record. Scenario 3 addresses the case where one of the applications does not have shared data structure support (e.g., VSAM access protocol support) turned ON, so that auto-correction is initiated to add the missing lock information into the shared data record, or simply for threading congestion the shared data record is not updated with the new lock information. Scenario 5 enables the true owner identification to be obtained by another process, and Scenario 6 is an auto-correct case to mitigate an out-of-sync issue by modifying the lock information record.

The above-noted scenarios are described further below with reference to the workflow example of FIGS. 3A-3B.

Referring initially to FIG. 3A, where request 300 is to add a resource lock 305, the resource lock is added 304, and the lock information record is added to the cache 306, as well as to the shared data structure of the database 308. Similarly, where the request 300 is to release or delete 312 a resource lock, then the lock information record is deleted from the cache 314, as well as being deleted from the shared data structure of the database 316.

Where the request is a request query 320 with associated expected owner data as described herein, program code references the associated cache for the lock information record 322. In one embodiment, the workflow includes determining whether the expiration timer associated with the lock information record in the cache has expired 324. If not, then processing determines whether the expected owner data matches the corresponding lock information in the cache 326, and if so, returns a reply with the user-owner information (userID) for the resource lock 328.

If the expiration timer for the lock information record has expired, or if the expected owner data does not match the corresponding lock information in the cache, then the lock information record is deleted from the cache 330, and processing locates an up-to-date version of the lock information record from the shared data structure of the database, for instance, using access protocols such as described herein 332. The processing determines whether the expected owner data matches the corresponding lock information in the lock information record obtained from the database 334. If so, then the lock information record retrieved from the database is added to the cache 336, and a reply is returned with the owner identification (userID) information 338.

Where the expected owner data does not match the corresponding lock information in the retrieved lock information record from the database, then an auto-correct situation 340 is encountered. FIG. 3B depicts one embodiment of auto-correct processing, depending on which of the scenarios described above has occurred, such as whether Scenario 2, Scenario 3 or Scenario 6 has occurred.

As illustrated in FIG. 3B, in one embodiment, auto-correct processing 340 includes obtaining the expected owner data 342 associated with the request query, and determining whether the expected owner data is null expected owner data, that is, is null data 344. If "yes", then processing determines whether the system providing the request query is the same system that acquired the resource lock 346. If "no", then the lock information record in the shared data structure of the database is honored, and a reply is returned with the owner information (userID) from the retrieved lock information record 348.

Where the system making the request query is different from the system that acquired the resource lock 346, then processing deletes the lock information record from the shared data structure of the database 350, and deletes the lock information record from the cache 351. This honors the information in the expected owner data, which is null data, and auto-corrects the shared data structure in the database, as well as the cache, to sync the database and cache with the latest expected owner data.

Where the expected owner data is other than null data 344, then processing determines whether the owner information is located in the shared data structure of the database 352. If not, then this is an example of Scenario 3 above, and the expected owner data is added into the shared data structure of the database as the lock information record 354, as well as into the cache as the lock information record 356. A reply is generated with the available owner information 358, resulting in the expected owner data being honored, and auto-correcting the shared data structure in the database and the cache to the expected owner data received with the request query. Where the owner information is found in the shared data structure of the database 352, then the owner information in the database does not match the expected owner data, and processing automatically auto-corrects the database and cache by updating the lock information record in the database 360 and in the cache 362 with the expected owner data, before providing a reply with the available owner information 358, thereby honoring the expected owner data and auto-correcting the database and cache to sync with the information received with the request query.

By way of example only, FIG. 4 depicts one detailed embodiment of a lock information record for a shared data structure of a database, in accordance with one or more aspects of the present invention. The record of FIG. 4 is one example only, and in one or more other embodiments, one or more of the noted content items can be omitted, and/or additional content items can be included in a lock information record such as disclosed herein. In one embodiment, the lock information record of FIG. 4 is configured for use as a VSAM record. For instance, in one implementation, each record of the VSAM has a size of 104-bytes, with the allocated bytes being as illustrated in FIG. 4. As one example, bytes 0-53 are a key (or dataset name (DSN)) for the record, bytes 54-61 (in this example) contain the lock owner identification data (userID), bytes 62-69 contain the system name (sysname) on which the resource lock is acquired, bytes 70-77 contain the job name (or process name) which acquired the resource lock, bytes 75-85 contain a task control block identifier (or thread identifier) associated with the obtained resource lock, bytes 86-89 contain an address space identifier (or process identifier) which acquired the resource lock, and bytes 90-103 contain, for instance, the date and time when the resource lock is acquired. Again, note that the particular content of the lock information record can vary, depending on the implementation. Where the operating system is a z/OS operating system, each DSN (key) can be allowed up to a maximum of 54 characters, including 44 for the dataset name (including periods), 8 for the member name, and 2 for the open '('and end')' symbols. If a field length is less than the maximum character allowed limit, then the remaining empty spaces can be padded as whitespace to ensure that each record is the desired number of characters for the access protocol being used within the clustered computing environment.

Another embodiment of facilitating processing within a clustered computing environment, as it relates to one or more aspects of the present invention, is described below with reference to FIGS. 5A-5D.

Referring to FIG. 5A, in one embodiment, the method includes saving by a process, based on a user acquiring a resource lock, a lock information record to a shared data structure of the clustered computing environment 500. The lock information record includes user identification data identifying the user-owner of the resource lock acquired on a system executing the process. The lock information record of the shared data structure is referenced, by another process, to ascertain the user identification data identifying the user-owner of the resource lock to facilitate processing within the clustered computing environment 502.

In one embodiment, the lock information record further includes a job name associated with obtaining the resource lock, and one or more of a system name of the system obtaining the resource lock, a task control lock identifier associated with the resource lock, an address space identifier associated with the resource lock, or a timestamp of when the lock information record was created 504.

In one embodiment, the method further includes, based on acquiring the resource lock, saving to a cache associated with the process the lock information record in addition to saving the lock information record to the shared data structure of the clustered computing environment, and initiating an expiration timer for the lock information record saved to the cache 506.

As illustrated in FIG. 5B, in one or more implementations, referencing of the shared data structure is based on a request query and associated expected owner data 508. The expected owner data includes expected owner information for the resource lock, and the method includes checking to determine whether the expiration timer for the lock information record saved to the cache has expired 510. Based on the expiration timer not having expired, the method includes determining whether the expected owner information of the expected owner data matches corresponding lock information of the lock information record in the cache to verify the lock information record 512. The expected owner information includes at least one of a userID identifying an expected user-owner of the resource lock, or an expected job name associated with the acquired resource lock. Further, the method includes, based on the expected owner information matching the corresponding lock information of the lock information record in the cache, providing a reply to the query request with the user identification data identifying the user-owner of the resource lock 514.

In one embodiment, where based on the expected owner information not matching the corresponding lock information of the lock information record in the cache 516, the method includes deleting the lock information record from the cache 518, and retrieving the lock information record from the shared data structure 520. Further, the determining includes determining whether the expected owner information of the expected owner data matches the corresponding lock information of the retrieved lock information record from the shared data structure to verify the lock information record 522, and based on the expected owner information matching the corresponding lock information, adding the retrieved lock information record to the cache, and providing a reply to the request query with the user identification data identifying the user-owner of the resource lock 524.

Referring to FIG. 5C, in one embodiment, based on the expected owner information not matching the corresponding lock information of the lock information record in the shared data structure, the method includes performing further record processing 526, where the further processing includes determining whether the expected owner data includes null expected owner data 528, and based on the expected owner data including null expected owner data, determining whether the request query is from the same system that acquired the resource lock 530. Based on the request query being from a different system than acquired the resource lock, the method includes honoring the retrieved lock information record and providing the user identification data from the retrieved lock information record in reply to the request query 532. Based on the system issuing the request query being the same as the system acquiring the resource lock, then the method includes deleting the lock information record from the shared data structure, and deleting the lock information record from the cache, to sync the shared data structure and the cache to the null expected owner data 534.

In one embodiment, where based on the expected owner data being other than null expected owner data 536, the further processing includes determining whether the user identification data is present in the shared data structure 538. Based on the user identification data not being located in the shared data structure, the method includes adding the expected owner data to the shared data structure as the lock information record, and adding the expected owner data to the cache as the lock information record 540. The available user identification data is then returned for the user-owner of the resource lock in reply to the request query 542.

Referring to FIG. 5D, in one embodiment, where based on the expected owner data being other than null expected owner data, and based on the user identification data being located in the shared data structure 544, the method includes updating the lock information record in the shared data structure using the expected owner data, and updating the lock information record in the cache using the expected owner data 546. Further, the method includes returning the user identification data identifying the user-owner of the resource lock from the updated lock information record in reply to the request query 548.

In one embodiment, the system is one logical partition of multiple logical partitions of the clustered computing environment, and the process is one application server, and the other process is another application server, and the other process executes on the same system that acquired the resource lock or on a different system than the system that acquired the resource lock 550.

Those skilled in the art will note from the description provided herein that user-owner identification of resource locks is facilitated across processes and systems of a clustered computing environment, which can be particularly advantageous during program development. In one implementation, a facility is provided to allow true lock-owner information to be accessible across different processes (or address spaces) within the same or different systems (e.g., logical partitions) in a clustered computing environment, such as a sysplex environment. In one or more embodiments, processing is facilitated using a timed cache lookup, with record correction capability for performance improvement. In one embodiment, using expected owner data provided with a query request allows the lock information records in the shared data structure to be corroborated, and for auto-correction of data to occur where there are inconsistencies. For instance, if the lock information record in the shared data structure for a given resource indicates an owner or a job that does not match the received non-null expected owner data with a query request, then the system or facility knows that the lock information record in the shared data structure is incorrect, and needs to be updated. This situation can occur if, for instance, the caching used for reducing I/O to the shared data structure does not expire before an event that leads to a change in lock ownership.

As one particular implementation, a computer-implemented facility is provided for tracking lock ownership on each process and each logical partition in a sysplex environment. The computer-implemented process includes: in response to acquisition of a lock by a user, populating a lock information record in a predetermined, shared data structure with lock information including a unique key of the record, a user-identifier associated with the owner of the lock, a system name associated with the lock, a job name associated with the lock, a task control block identifier, an address space identifier, and/or a timestamp of when the lock information record was created; populating a cache associated with each process, including a list of resources owned by each user, and an expiration timer to track ownership information of the lock in addition to populating the record in the predetermined data structure; in response to releasing the lock of the user, removing the corresponding lock information record from the predetermined data structure; in response to receiving a request for lock information, determining whether the cache is within a valid time threshold using the expiration timer; in response to expiration of the expiration timer and a query lookup being triggered, self-updating the cache using the latest content of the predetermined data structure to mitigate a potential out-of-sync issue; in response to a determination that the cache is within a valid time duration, executing a query determining whether the lock was acquired by a user in at least one other process and/or other logical partition, to return the user-identifier of the owner of the lock resource(s); in response to a determination the user-identifier of a lock-owner returned from a conventional method differs from the user-identifier of the lock-owner returned from the query lock method using the shared data structure, executing auto-correction of out-of-sync information, including modifying the record, adding a missing record or deleting a record; in response to an end of a current session for the user, removing the corresponding record from the shared data structure using a list of resources obtained from the cache as keys to locate the corresponding record in the shared data structure; and logging in an audit log a history of lock records for, for instance, each user.

Figure 6A:
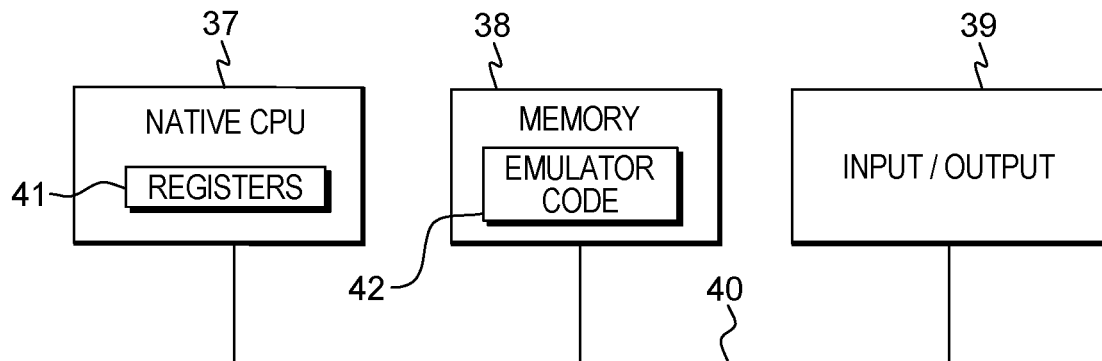
FIG. 6A depicts another example of a computing environment to incorporate and use one or more aspects of the present invention.

Another embodiment of a computing environment to incorporate and use one or more aspects of the present invention is described with reference to FIG. 6A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a PowerPC® processor offered by International Business Machines Corporation, Armonk, New York; an HP Superdome with Intel® Itanium® II processors offered by Hewlett Packard Co., Palo Alto, California; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Itanium is a trademark or registered trademark of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 6B:
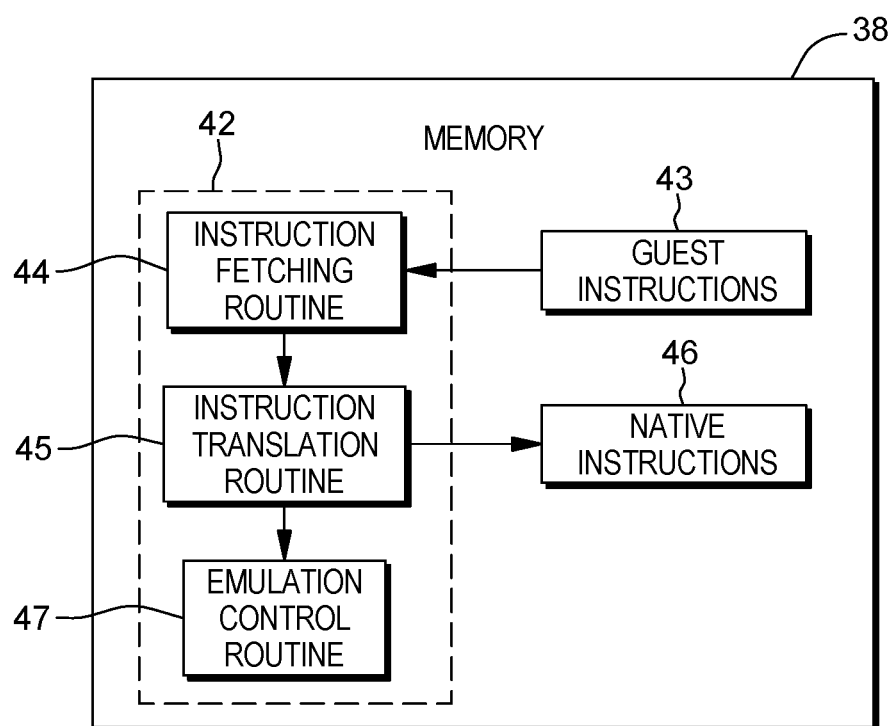
FIG. 6B depicts further details of the memory of FIG. 6A, in accordance with one or more aspects of the present invention.

Further details relating to emulator code 42 are described with reference to FIG. 6B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture hardware architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

One instruction that may be emulated is the Reset Dynamic Address Translation Protection instruction described herein, in accordance with an aspect of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
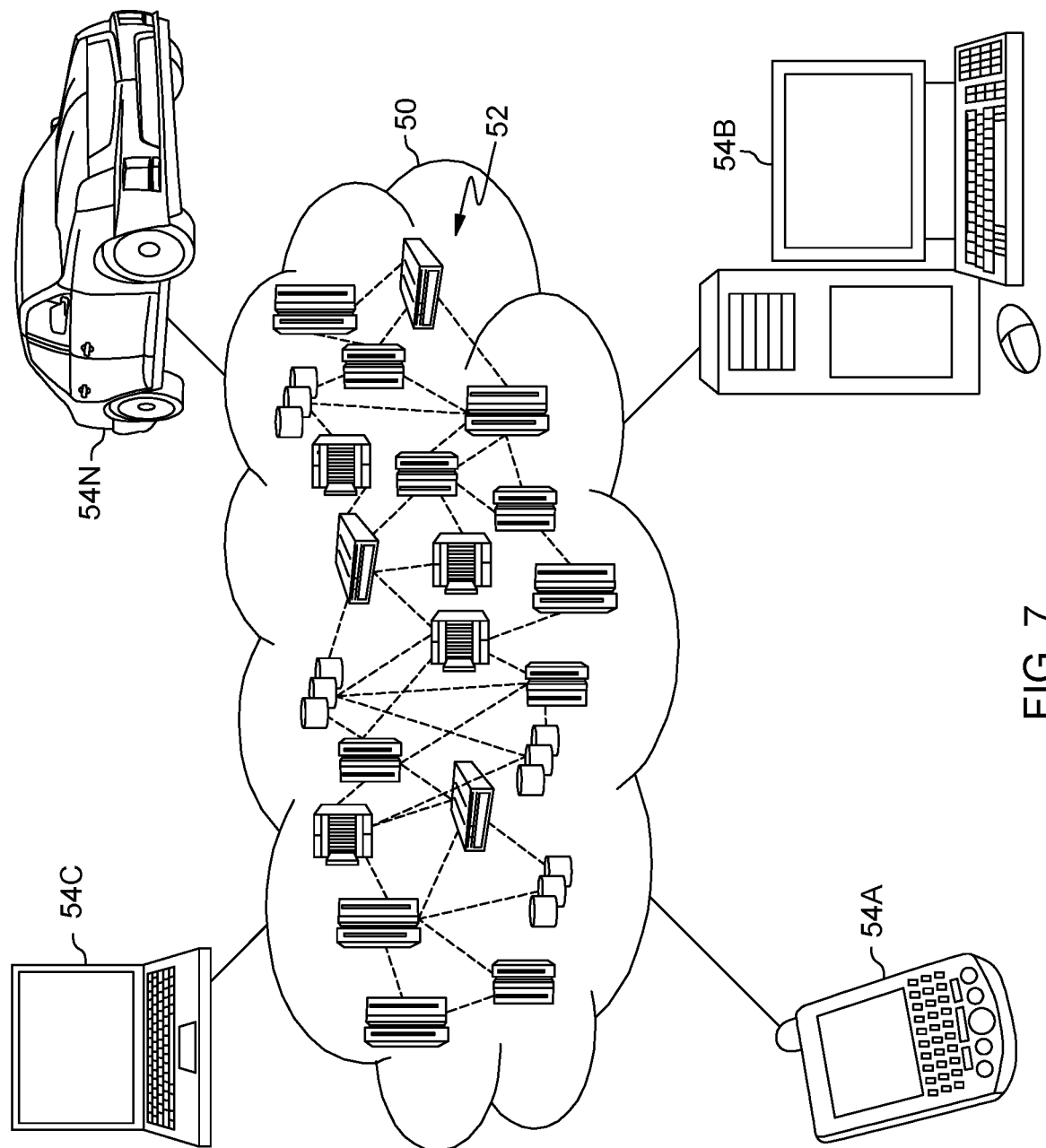
FIG. 7 depicts one embodiment of a cloud computing environment, in accordance with one or more aspects of the present invention.

Referring now to FIG. 7, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 52 and cloud computing environment 50 can communicate with any type of computerized device over any type of network and/or network addressable connection (e.g., using a web browser).

Figure 8:
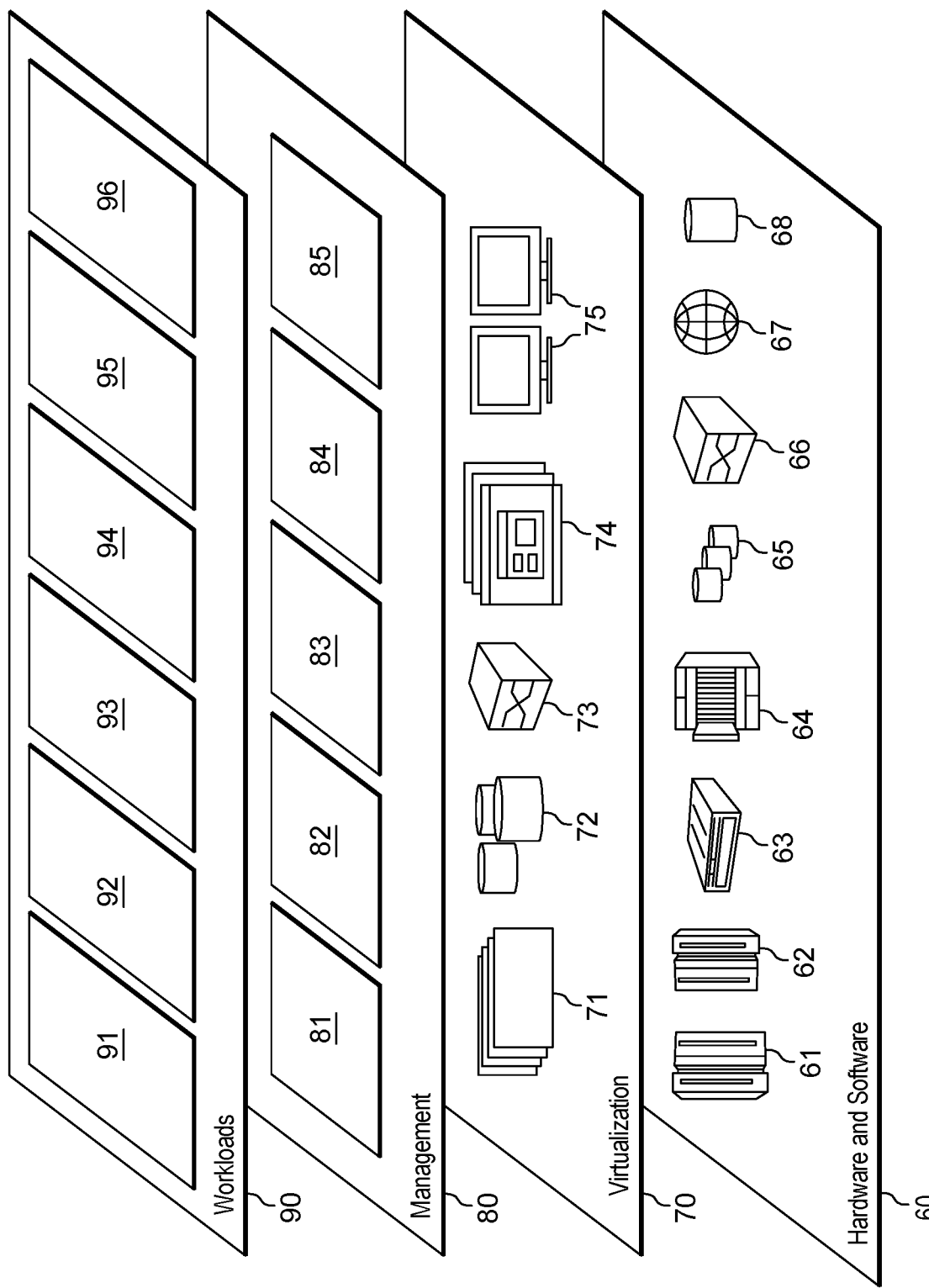
FIG. 8 depicts one example of abstraction model layers, in accordance with one or more aspects of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and identification processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions or operations may be used. Additionally, different types of registers and/or different register may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a clustered computing environment, the computer program product comprising:
    at least one computer-readable storage medium having program instructions embodied therewith, the program instructions being readable by a processing circuit to cause the processing circuit to perform a method comprising:
        saving by an application server executing on a logical partition of the clustered computing environment, based on the logical partition of the clustered computing environment acquiring a resource lock, a lock information record to a shared data structure of the clustered computing environment, the lock information record including identification data identifying a user-owner of the resource lock acquired on the logical partition executing the application server; and referencing, by another application server of the clustered computing environment, the lock information record of the shared data structure to ascertain the identification data identifying the user-owner of the resource lock to facilitate processing within the clustered computing environment, wherein the shared data structure resides on a database of the clustered computing environment separate from the logical partition and accessible by the application server and by the other application server, and wherein the referencing is based on a request query, and associated expected owner data to facilitate the processing within the clustered computing environment, the expected owner data including expected owner information for the resource lock.

2. The computer program product of claim 1, wherein the lock information record further includes a job name associated with obtaining the resource lock, and one or more of a name of the logical partition obtaining the resource lock, a task control block identifier associated with the resource lock, an address space identifier associated with the resource lock, or a timestamp of when the lock information record was created.

3. The computer program product of claim 1, further comprising, based on acquiring the resource lock, saving to a cache associated with the process the lock information record in addition to saving the lock information record to the shared data structure of the clustered computing environment, and initiating an expiration timer for the lock information record saved to the cache.

4. The computer program product of claim 3, wherein the method includes:
checking to determine whether the expiration timer for the lock information record saved to the cache has expired;
based on the expiration timer not having expired, determining whether the expected owner information of the expected owner data matches corresponding lock information of the lock information record in the cache to verify the lock information record, the expected owner information comprising at least one of a userID identifying an expected user-owner of the resource lock or an expected job name associated with the acquired resource lock; and
based on the expected owner information matching the corresponding lock information of the lock information record in the cache, providing a reply to the query request with the user identification data identifying the user-owner of the resource lock.

5. The computer program product of claim 4, wherein based on the expected owner information not matching the corresponding lock information of the lock information record in the cache, the method includes:
deleting the lock information record from the cache;
retrieving the lock information record from the shared data structure; and
wherein the determining further comprises:
determining whether the expected owner information of the expected owner data matches the corresponding lock information of the retrieved lock information record from the shared data structure to verify the lock information record; and
based on the expected owner information matching the corresponding lock information, adding the retrieved lock information record to the cache, and providing a reply to the request query with the user identification data identifying the user-owner of the resource lock.

6. The computer program product of claim 5, wherein based on the expected owner information not matching the corresponding lock information of the lock information record in the shared data structure, performing further record processing, the further record processing comprising:
determining whether the expected owner data comprises null expected owner data;
based on the expected owner data comprising null expected owner data, determining whether the request query is from the same logical partition that acquired the resource lock;
based on the request query being from a different logical partition than acquired the resource lock, honoring the retrieved lock information record and providing the user identification data from the retrieved lock information record in reply to the request query; and
based on the logical partition issuing the request query being the same as the logical partition acquiring the resource lock, deleting the lock information record from the shared data structure and deleting the lock information record from the cache, to sync the shared data structure and the cache to the null expected owner data.

7. The computer program product of claim 6, wherein based on the expected owner data being other than null expected owner data, the further processing includes:
determining whether the identification data is present in the shared data structure;
based on the identification data not being located in the shared data structure, adding the expected owner data to the shared data structure as the lock information record, and adding the expected owner data to the cache as the lock information record; and
returning available user identification data for the user-owner of the resource lock in reply to the request query.

8. The computer program product of claim 6, wherein based on the expected owner data being other than null expected owner data, and based on the identification data being located in the shared data structure:
updating the lock information record in the shared data structure using the expected owner data, and updating the lock information record in the cache using the expected owner data; and
returning the identification data identifying the user-owner of the resource lock from the updated lock information record in reply to the request query.

9. The computer program product of claim 1, wherein the other application server executes on a different logical partition from the logical partition that acquired the resource lock.

10. A computer system for facilitating processing within a clustered computing environment, the computer system comprising:
a memory; and
a processing circuit in communication with the memory, wherein the computer system is configured to perform a method, the method comprising:
saving by an application server executing on a logical partition of the clustered computing environment, based on the logical partition of the clustered computing environment acquiring a resource lock, a lock information record to a shared data structure of the clustered computing environment, the lock information record including identification data identifying a user-owner of the resource lock acquired on the logical partition executing the application server; and referencing, by another application server of the clustered computing environment, the lock information record of the shared data structure to ascertain the identification data identifying the user-owner of the resource lock to facilitate processing within the clustered computing environment, wherein the shared data structure resides on a database of the clustered computing environment separate from the logical partition and accessible by the application server and by the other application server, and wherein the referencing is based on a request query, and associated expected owner data to facilitate the processing within the clustered computing environment, the expected owner data including expected owner information for the resource lock.

11. The computer system of claim 10, wherein the lock information record further includes a job name associated with obtaining the resource lock, and one or more of a name of the logical partition obtaining the resource lock, a task control block identifier associated with the resource lock, an address space identifier associated with the resource lock, or a timestamp of when the lock information record was created.

12. The computer system of claim 10, further comprising, based on acquiring the resource lock, saving to a cache associated with the process the lock information record in addition to saving the lock information record to the shared data structure of the clustered computing environment, and initiating an expiration timer for the lock information record saved to the cache.

13. The computer system of claim 12, wherein the method includes:
checking to determine whether the expiration timer for the lock information record saved to the cache has expired;
based on the expiration timer not having expired, determining whether the expected owner information of the expected owner data matches corresponding lock information of the lock information record in the cache to verify the lock information record, the expected owner information comprising at least one of a userID identifying an expected user-owner of the resource lock or an expected job name associated with the acquired resource lock; and
based on the expected owner information matching the corresponding lock information of the lock information record in the cache, providing a reply to the query request with the user identification data identifying the user-owner of the resource lock.

14. The computer system of claim 13, wherein based on the expected owner information not matching the corresponding lock information of the lock information record in the cache, the method includes:
deleting the lock information record from the cache;
retrieving the lock information record from the shared data structure; and
wherein the determining further comprises:
determining whether the expected owner information of the expected owner data matches the corresponding lock information of the retrieved lock information record from the shared data structure to verify the lock information record; and
based on the expected owner information matching the corresponding lock information, adding the retrieved lock information record to the cache, and providing a reply to the request query with the user identification data identifying the user-owner of the resource lock.

15. The computer system of claim 14, wherein based on the expected owner information not matching the corresponding lock information of the lock information record retrieved in the shared data structure, performing further record processing, the further record processing comprising:
determining whether the expected owner data comprises null expected owner data;
based on the expected owner data comprising null expected owner data, determining whether the request query is from the same logical partition that acquired the resource lock;
based on the request query being from a different logical partition than acquired the resource lock, honoring the retrieved lock information record and providing the user identification data from the retrieved lock information record in reply to the request query; and
based on the logical partition issuing the request query being the same as the logical partition acquiring the resource lock, deleting the lock information record from the shared data structure and deleting the lock information record from the cache, to sync the shared data structure and the cache to the null expected owner data.

16. The computer system of claim 15, wherein based on the expected owner data being other than null expected owner data, the further processing includes:
determining whether the identification data is present in the shared data structure;
based on the identification data not being located in the shared data structure, adding the expected owner data to the shared data structure as the lock information record, and adding the expected owner data to the cache as the lock information record; and
returning available user identification data for the user-owner of the resource lock in reply to the request query.

17. The computer system of claim 15, wherein based on the expected owner data being other than null expected owner data, and based on the identification data being located in the shared data structure:
updating the lock information record in the shared data structure using the expected owner data, and updating the lock information record in the cache using the expected owner data; and
returning the identification data identifying the user-owner of the resource lock from the updated lock information record in reply to the request query.

18. A computer-implemented method of facilitating processing within a clustered computing environment, the computer-implemented method comprising:
saving by an application server executing on a logical partition of the clustered computing environment, based on the logical partition of the clustered computing environment acquiring a resource lock, a lock information record to a shared data structure of the clustered computing environment, the lock information record including identification data identifying a user-owner of the resource lock acquired on the logical partition executing the application server; and referencing, by another application server of the clustered computing environment, the lock information record of the shared data structure to ascertain the identification data identifying the user-owner of the resource lock to facilitate processing within the clustered computing environment, wherein the shared data structure resides on a database of the clustered computing environment separate from the logical partition and accessible by the application server and by the other application server, and wherein the referencing is based on a request query, and associated expected owner data to facilitate the processing within the clustered computing environment, the expected owner data including expected owner information for the resource lock.

19. The computer-implemented method of claim 18, wherein the lock information record further includes a job name associated with obtaining the resource lock, and one or more of a system name of the system obtaining the resource lock, a task control block identifier associated with the resource lock, an address space identifier associated with the resource lock, or a timestamp of when the lock information record was created.

20. The computer-implemented method of claim 18, wherein the other application server executes on a different logical partition from the logical partition that acquired the resource lock.

* * * * *